(12) United States Patent  
Beauchamp et al.

(10) Patent No.: US 8,817,016 B2
(45) Date of Patent: Aug. 26, 2014

(54) GENERATION OF A MODIFIED 3D IMAGE OF AN OBJECT COMPRISING TOOL MARKS

(75) Inventors: Alain Beauchamp, Montréal (CA); Danny Roberge, St-Bruno (CA); Benoit Perron, Boucherville (CA)

(73) Assignee: Forensic Technology WAI, Inc., Montreal, Quebec (CA)

( * ) Notice: Subject to any disclaimer, the term of this patent is extended or adjusted under 35 U.S.C. 154(b) by 428 days.

(21) Appl. No.: 13/080,761

(22) Filed: Apr. 6, 2011

(65) Prior Publication Data

US 2011/0248990 A1    Oct. 13, 2011

Related U.S. Application Data

(60) Provisional application No. 61/322,041, filed on Apr. 8, 2010.

(51) Int. Cl.
*G06T 19/00* (2011.01)
*G06T 3/00* (2006.01)
*G06T 5/50* (2006.01)

(52) U.S. Cl.
CPC ..... *G06T 3/0012* (2013.01); *G06T 2207/10056* (2013.01); *G06T 5/50* (2013.01)
USPC ............ 345/419; 345/629; 382/154; 359/386

(58) Field of Classification Search
USPC ............... 345/419; 382/293, 154; 359/386
See application file for complete search history.

(56) References Cited

U.S. PATENT DOCUMENTS

| | | | | |
|---|---|---|---|---|
| 6,242,163 | B1 * | 6/2001 | Stampfl et al. | 430/322 |
| 6,449,088 | B1 * | 9/2002 | Pettingell et al. | 359/386 |
| 6,546,208 | B1 * | 4/2003 | Costales | 396/324 |
| 6,697,734 | B1 | 2/2004 | Suomela | |
| 7,212,949 | B2 | 5/2007 | Bachrach | |
| 2002/0133263 | A1 | 9/2002 | Ouellet et al. | |
| 2005/0244080 | A1 | 11/2005 | Nadeau et al. | |
| 2007/0213942 | A1 | 9/2007 | Ponson et al. | |
| 2009/0180177 | A1 | 7/2009 | Gilbert | |
| 2009/0220169 | A1 | 9/2009 | Bennet et al. | |

(Continued)

FOREIGN PATENT DOCUMENTS

WO    2005089434    9/2005

OTHER PUBLICATIONS

International Search Report dated Jun. 10, 2011 issued by the International Bureau (WIPO) in connection with the corresponding International patent application No. PCT/CA2011/000382.

(Continued)

*Primary Examiner* — Kimbinh T Nguyen
(74) *Attorney, Agent, or Firm* — Norton Rose Fulbright Canada LLP (57) ABSTRACT

There is provided a method for generating a 3D representation of an object, comprising: acquiring 3D topographic data representative of at least one portion of the object having a macroscopic form and microscopic features; separating the 3D topographic data into microscopic data representative of the microscopic features and macroscopic data representative of the macroscopic form; independently scaling one of the microscopic data and the macroscopic data in order to enhance the microscopic features with respect to the macroscopic form, thereby obtaining scaled topographic data; and generating a 3D image using the scaled topographic data, thereby obtaining a modified representation having enhanced microscopic features for the at least one portion of the object.

19 Claims, 8 Drawing Sheets

(56) References Cited

U.S. PATENT DOCUMENTS

2009/0284756 A1 11/2009 Roberge et al.
2011/0175900 A1* 7/2011 Beeler et al. .................. 345/419
2012/0313937 A1* 12/2012 Beeler et al. .................. 345/419

OTHER PUBLICATIONS

Desmond et al., "Comparison of three-dimensional optical coherence tomography and high resolution photography for art conservation studies", Nov. 27, 2007, Optics Express, vol. 15, No. 24, pp. 15972-15986.

FirearmsID.com, "An introduction to forensic firearm identification", [http://www.firearmsid.com/A_BulletIDhtm], Jan. 2, 2010.

Ibis Trax-3D, "Benefits of combining 2D and 3D images Ibis Trax-3D", Dec. 31, 2008.

Lunce, "Computer simulations in distance education", International Journal of Instructional Technology and Distance Learning, Oct. 2004, vol. 1, No. 10.

Forensic Sciences, "Forensic Sciences: Review of status and needs Coordination", US Department of Justice Office of Justice Programs National Institute of Justice, Feb. 1999 obtained from the Internet on Feb. 1, 2010 form [http://www.sitebird.com/Computer_Simulations_in_Distance_Education_80117#download_link].

* cited by examiner

GENERATION OF A MODIFIED 3D IMAGE OF AN OBJECT COMPRISING TOOL MARKS

CROSS-REFERENCE TO RELATED APPLICATIONS

This application claims priority under 35 U.S.C. §119(e) from U.S. Provisional Patent Application No. 61/322,041, filed on Apr. 8, 2010, the contents of which are hereby incorporated by reference.

TECHNICAL FIELD

The present invention relates to the field of 3D image generation.

BACKGROUND

In the field of forensic ballistics, microscopic tool marks present on different types of objects are compared to find matching tool marks and link the objects together, such as bullets, and eventually link the objects to another object, such as a recovered firearm. However, the comparison of the tool marks may be particularly challenging, especially when only a few tool marks are present on the bullet, or when the bullets have different forms.

Therefore, there is a need for an improved method and system for comparing ballistic objects.

SUMMARY

According to a first broad aspect, there is provided a method for generating a 3D representation of an object, comprising: acquiring 3D topographic data representative of at least one portion of the object having a macroscopic form and microscopic features; separating the 3D topographic data into microscopic data representative of the microscopic features and macroscopic data representative of the macroscopic form; independently scaling one of the microscopic data and the macroscopic data in order to enhance the microscopic features with respect to the macroscopic form, thereby obtaining scaled topographic data; and generating a 3D image using the scaled topographic data, thereby obtaining a modified representation having enhanced microscopic features for the at least one portion of the object.

According to a second broad aspect, there is provided a system for generating a 3D representation of an object, comprising: a processing unit; a memory for storing original 3D topographic data representative of at least one portion of the object having a macroscopic form and microscopic features; and an application coupled to the processing unit and the memory, wherein the application, when executed on the processing unit, performs steps of: separating the 3D topographic data into microscopic data representative of the microscopic features and macroscopic data representative of the macroscopic form; independently scaling one of the microscopic data and the macroscopic data in order to enhance the microscopic features with respect to the macroscopic form, thereby obtaining scaled topographic data; and generating a 3D image using the scaled topographic data, thereby obtaining a modified representation having enhanced microscopic features for the at least one portion of the object.

According to a third broad aspect, there is provided a software product embodied on a computer readable medium and comprising instructions for generating a 3D representation of an object, comprising: a splitting module adapted to separate 3D topographic data representative of at least one portion of the object having a macroscopic form and microscopic features into microscopic data representative of the microscopic features and macroscopic data representative of the macroscopic form; an enhancing module adapted to independently scale one of the microscopic data and the macroscopic data in order to enhance the microscopic features with respect to the macroscopic form, thereby obtaining scaled topographic data; and an image generator adapted to generate a 3D image using the scaled topographic data, thereby obtaining a modified representation having enhanced microscopic features for the at least one portion of the object.

The term "object" refers to any object comprising tool marks which may be used as a Ballistic Piece of Evidence (BPOE). Examples of an object comprise a bullet or a portion of a bullet, a barrel or a portion of a barrel, and the like. While the description uses the term "bullets", this is done for illustrative purposes and should not be construed in a limiting manner.

The expression "3D topographic data" refers to a mathematical representation of the three dimensional surface of a physical object as a collection of points defined by 3D coordinates (x, y, z). The 3D topographic data is the result of measurements at selected locations on the surface of a physical object by a suitable 3D sensor. Specialized software can connect the set of points by geometrical structures (triangles, polygons, curved surfaces) which fill the empty space between the points in order to generate a continuous surface and display a realistic representation of the surface imaged by the sensor.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Visual comparison of microscopic tool marks present on two bullets under a comparison microscope may be significantly challenging, especially when only a few marks are present on the bullets. In this case, the number of matching lines on any single region of interest may not be sufficient to state that the pair of bullets is a "conclusive pair", i.e. a pair of bullets fired from a same firearm. The firearm technician must then look for groups of matching lines over several regions of interest.

This operation may be challenging due to limitations of the comparison microscope. In some instances, the bullets may have a circular cross section, i.e. a pristine form, and the symmetry axis of each bullet may coincide with the rotation axis when placed in the comparison microscope. In this case, the expert can compare the bullets by manually rotating each bullet around its corresponding rotation axis. However, in other instances, the symmetry axis and the rotation axis for one bullet may not coincide. The firearm expert must then apply several manual operations comprising rotating the bullets, translating the bullets and varying the position and intensity of the light sources in order to compare the two bullets. These operations are particularly challenging for bullets with very few small marks.

Figure 1:
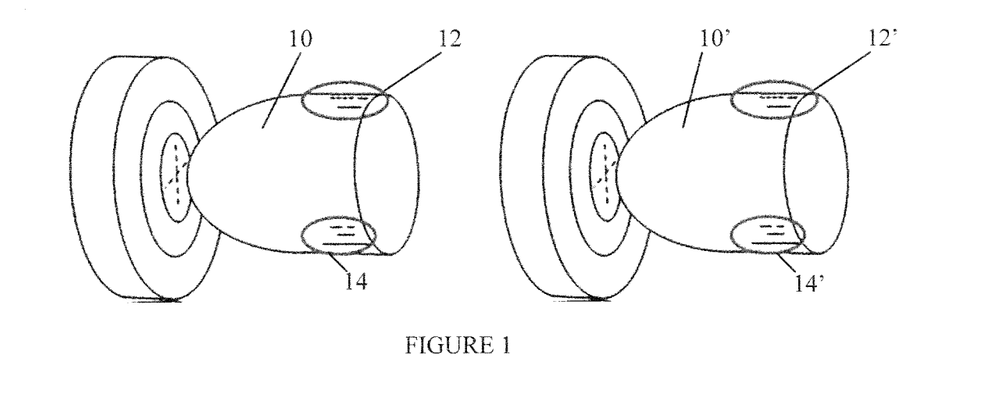
FIG. 1 illustrates two exemplary pristine bullets each having two regions of interest.

FIG. 1 illustrates two pristine bullets 10 and 10', each having two regions of interest 12, 14, and 12', 14', respectively, i.e. two regions comprising tool marks suitable for visual analysis. In this example, each region of interest 12, 14, 12', and 14' only comprises a few tool marks.

An expert looking at the bullets 10 and 10' under a comparison microscope can only see the portion of each bullet 10 and 10' which is in the field of view of the microscope. In some instances, it is possible to find and align similar marks which appear on both bullets 10 and 10'. However, the expert can only compare one region of interest at a time because of the limited field of view of the microscope. In the example illustrated in FIG. 1, the number of matching marks on each region of interest is not sufficient to state that the bullets 10 and 10' constitute a conclusive pair. The expert must then analyze other regions of interest for the bullets 10 and 10'. The challenge is to manipulate both bullets 10 and 10' when searching for other aligned and similar marks while keeping aligned the previously matching lines since the latter lines no longer appear in the field of view of the microscope.

Figure 2:
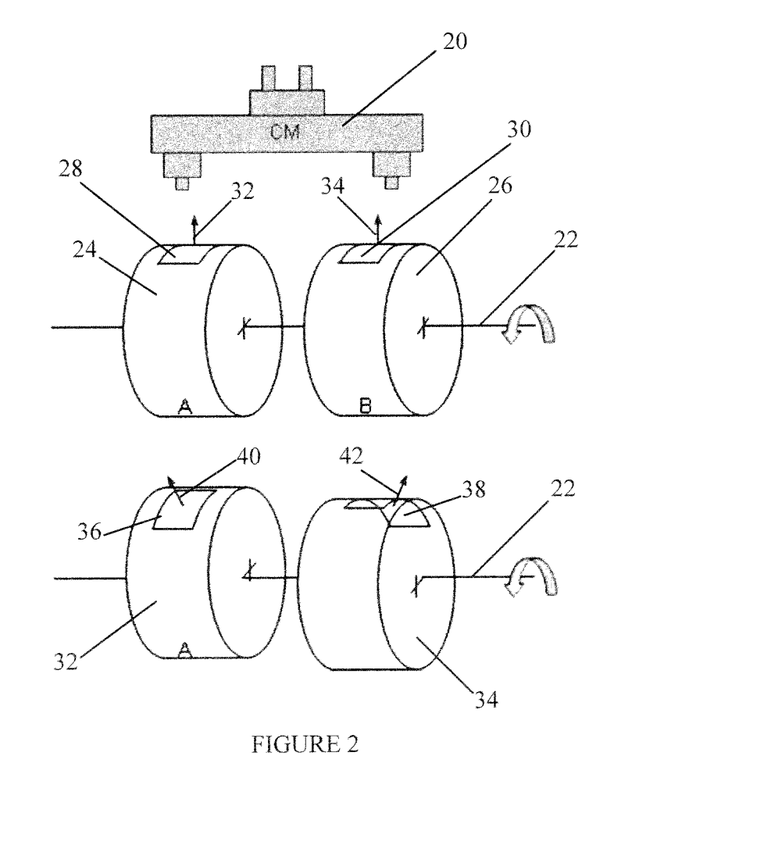
FIG. 2 illustrates the positioning of exemplary bullets under a comparison microscope.

FIG. 2 illustrates the positioning of bullets under a comparison microscope 20. For illustration purposes, the bullets are illustrated as cylinders with a circular cross section. Each bullet is installed on a different rotation stage of the comparison microscope. The microscope rotation axis 22 is represented by the horizontal line through the bullets. The intersection of the axis of symmetry of each bullet with the surface of the bullet is represented by an "X".

The bullets 24 and 26 represent an ideal situation. They have a pristine shape and substantially the same diameter. The rectangles 28 and 30 represent the areas within the field of view of the microscope for analysis. Arrows 32 and 34 which represent the local vectors normal to the topography in rectangles 28 and 30 are vertical. The areas 28 and 30 on both bullets 24 and 26 can then be compared under optimal lighting conditions. Furthermore, if they are found on both bullets 24 and 26, matching lines remain aligned if a same rotation is applied to the bullets 24 and 26. Then, if a new set of matching and aligned marks is found on other regions of the bullets 24 and 26, one can assume that the first group of matching lines is still aligned. The expert can state that the bullets 24 and 26 form a conclusive pair when the number of groups of matching and aligned marks is sufficiently high.

However, bullets are usually not perfectly placed along the rotation axis of the comparison microscope. This situation is represented by bullets 32 and 34. For bullets 32 and 34, the symmetry axis represented by the "X" does not coincide with the rotation axis 22 of the microscope 20. By rotating the rotation axis 22 of the microscope 20, the normals 40, 42 of the areas 36 and 38, respectively, being compared do not remain parallel. The expert must then change the position and intensity of the light sources during the operation in addition to translating the rotation axis 22. If they are found on both bullets 32 and 34, matching lines will not necessarily remain aligned when the expert will try to find a new set of matching marks. One cannot assume that the first group of matching lines will remain aligned after several manipulations of the rotation axis 22 of the microscope 20. As result, the efficiency of the visual analysis procedure under a comparison microscope is reduced, particularly for bullets having few potential matching marks on each region of interest.

The efficiency of the analysis procedure is further reduced when at least one of the compared bullets is highly deformed. In this case, the operations to be applied on both bullets may be significantly different. For example, while rotation may be sufficient for the comparison of pristine bullets, a combination of rotations and translations may be necessary when at least one bullet is deformed. However, the analysis of deformed bullets is a key operation to solve crime since bullets found on crime scenes are usually deformed. In contrast, pristine or non-deformed bullets are obtained from firing in forensic laboratories with special equipment adapted to prevent deformation.

Figure 3:
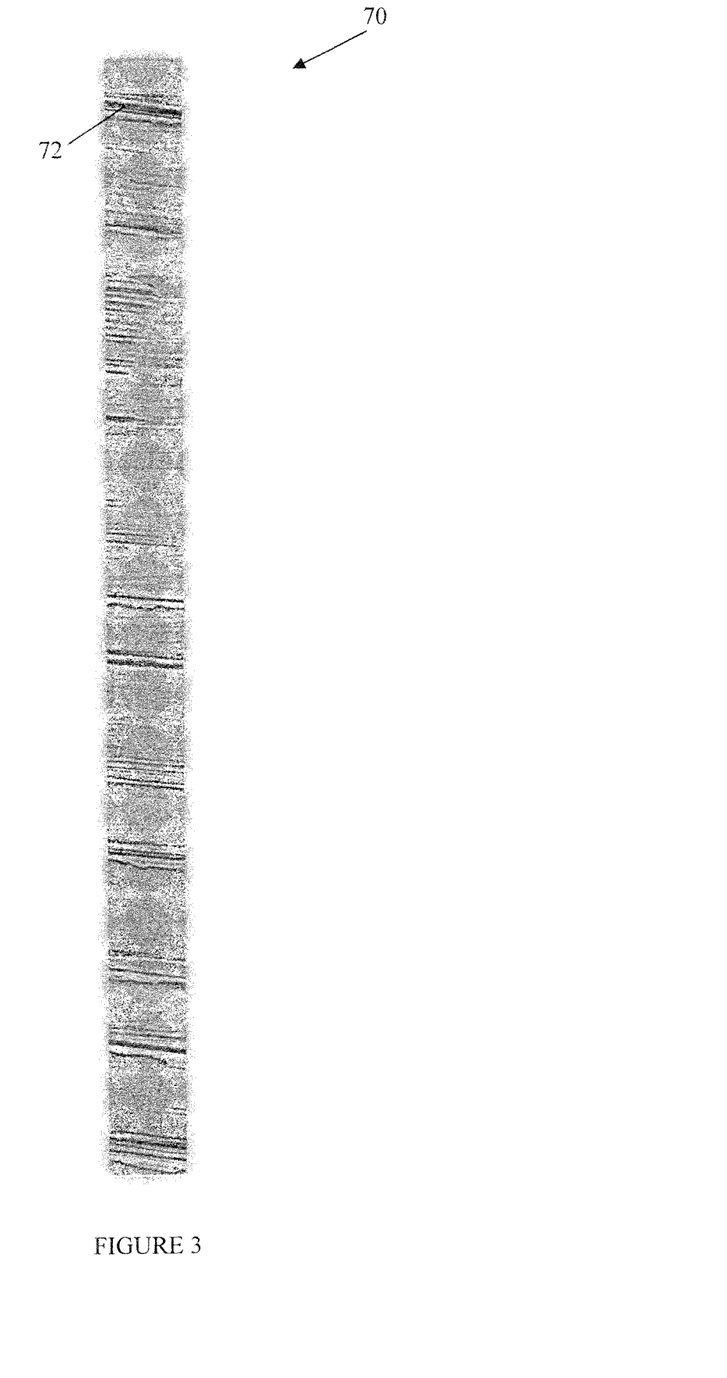
FIG. 3 illustrates an exemplary roughness image for a portion of a bullet.

One alternative to visual analysis under a comparison microscope consists in generating roughness images for a bullet. Different regions of interest of a bullet are scanned and a roughness image is generated for each region of interest. FIG. 3 illustrates one example of a roughness image 70. The roughness image 70 is an elongated and planar image representing the roughness on the acquired region of interest. The color or grayscale of the image pixels is representative of the depth of the portion of the bullet represented by the pixel. For example, the dark line 72 is representative of a tool mark.

In order to determine whether a pair of bullets is a conclusive match, roughness images of the two bullets are compared. The expert may translate one roughness image with respect to the other in order to find matching lines between the two roughness images. Since it is planar, a roughness image provides no information about the form or shape of the region of interest it represents. As a result, bullets with different forms may be compared. However, if the roughness images are used to find matching tool marks on a bullet to be confirmed via a visual comparison using a comparison microscope such as the microscope 20, the user may have difficulty visually locating the region of interest corresponding to a particular roughness image on the bullet since the form of the region of interest is unknown while looking at the roughness image.

Figure 4:
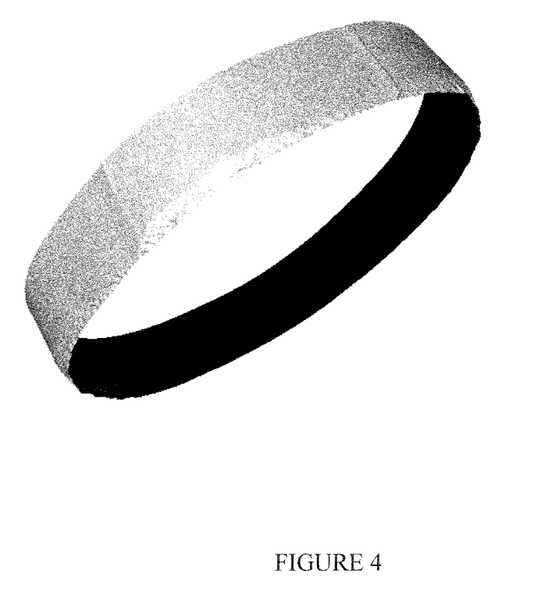
FIG. 4 is an image representing an exemplary topography of a bullet generated by a virtual comparison microscope.

A virtual comparison microscope is adapted to display the 3D topography of two bullets to be compared. The displayed image of a bullet is a representation of the 3D topography of the bullet. However, since the depth of a tool mark is typically 1000 times smaller than the usual dimension and/or radius of curvature of usual regions of interest, the tool marks are not easily visible when the whole region of interest is displayed, as illustrated in FIG. 4. The depth of a tool mark which is typically at the micron scale is much smaller than the size of the bullet which is usually at the millimeter or centimeter scale. Therefore, the change of gray scale intensity in the image of FIG. 4 is mostly indicative of the form variation and not of tool marks.

By zooming on a region of interest, the tool marks comprised in the region of interest become more visible but information about the form of the region of interest is lost. Therefore, it may be difficult to locate the zoomed region of interest on the bullet. Furthermore, a virtual microscope presents the same drawback as a real comparison microscope, i.e. numerous manipulations are required in order to compare bullets having different forms.

Figure 5:
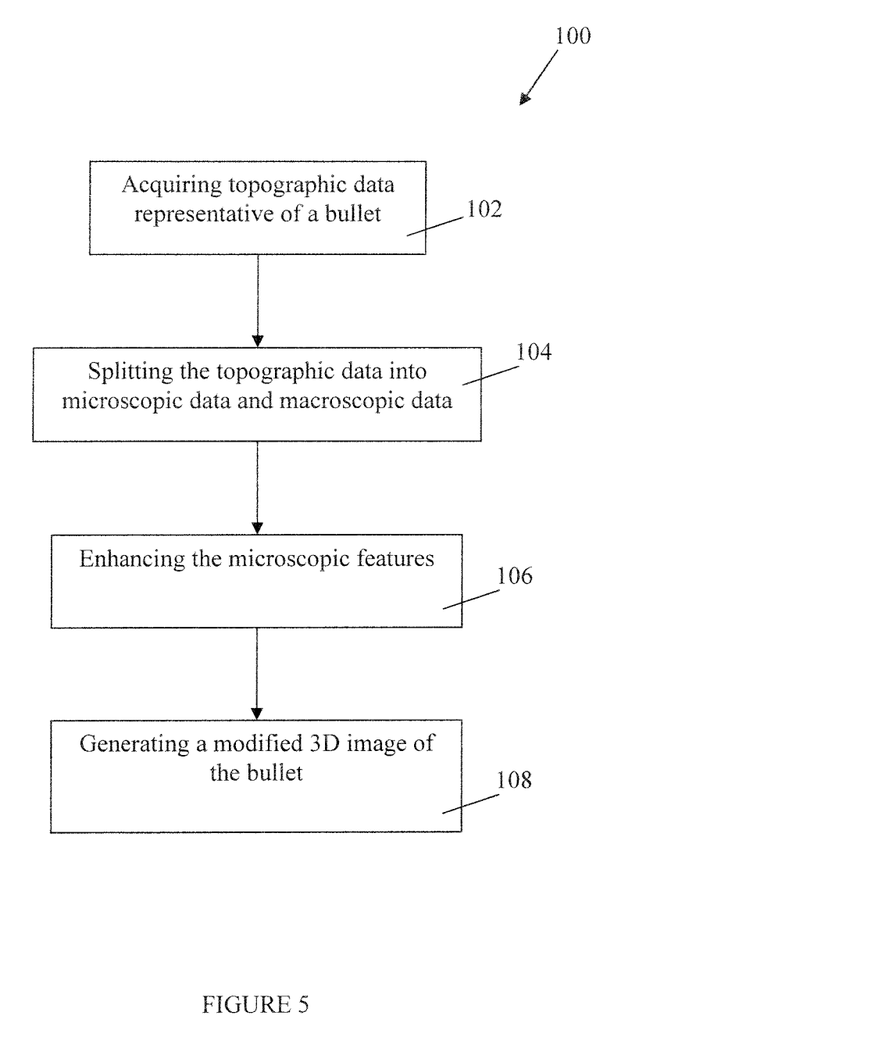
FIG. 5 is a flow chart of a method for generating a modified representation of a bullet, in accordance with an embodiment.

FIG. 5 illustrates one embodiment of a method 100 for generating a modified image of at least one region of a bullet. The bullet has a macroscopic form and presents microscopic features such as microscopic tool marks on its surface. The first step 102 comprises acquiring 3D topographic data representative of the 3D-surface topography of the bullet. Any adequate system adapted to scan the bullet in order to obtain the 3D-surface topography of the bullet at the required resolution may be used. Examples of adequate sensors comprise laser profilometers, confocal microscopes, and the like.

The second step 104 comprises splitting (or separating) the acquired topographic data into two sets of data, i.e. microscopic data and macroscopic data. The microscopic data is representative of the microscopic features of the 3D-surface topography of the scanned region. The microscopic features have a micron-order size. The macroscopic data is representative of the overall form of the topography of the scanned region which has a size and/or a radius of curvature in the order of millimeters or centimeters.

In one embodiment, an adequate low-pass filter is applied to the topographic data in order to obtain the macroscopic data. The microscopic data is then obtained by subtracting the macroscopic data from the topographic data.

In another embodiment, an adequate high-pass filter is applied to the topographic data to directly obtain the microscopic data, and the macroscopic data is obtained by subtracting the obtained microscopic data from the topographic data.

Referring back to FIG. 5, the third step 106 comprises enhancing the microscopic features of the topography of the acquired portion of the bullet without modifying the form of the bullet. The enhancing step is performed by independently scaling the microscopic data or the macroscopic data.

Figure 6A:
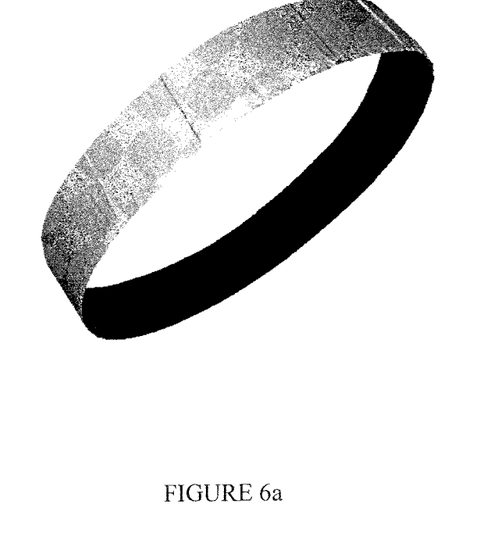
FIG. 6*a* illustrates a 3D topography of a bullet, in accordance with an embodiment.
Figure 6B:
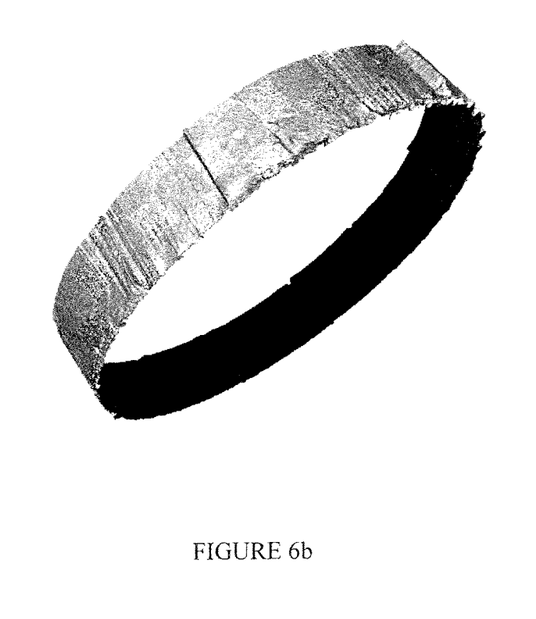
FIG. 6*b* illustrates the 3D topography of the bullet from FIG. 6*a* provided with enhanced microscopic features, in accordance with an embodiment.

In one embodiment, a scaling factor having an absolute value greater than one is applied to the microscopic data independently from the macroscopic data in order to enhance the microscopic features with respect to the macroscopic form. In this case, the size of the microscopic features is increased while the macroscopic form of the bullet remains unchanged. The scaling factor is chosen as a function of a desired degree of enhancement for the microscopic features of the topography. FIG. 6a illustrates the topography of a bullet portion generated using the acquired topographic data. By applying a scaling factor equal to five to the microscopic data, the size of the microscopic features of the topography, i.e. the microscopic peaks and valleys/crevices, is increased while the macroscopic form of the bullet remains unchanged, as illustrated in FIG. 6b.

The scaled microscopic data is then combined with the macroscopic data to obtain scaled topographic data representative of the unchanged form of the scanned portion of the bullet with the enhanced microscopic features thereon.

The next step 108 comprises the generation of a 3D image of the scanned portion of the bullet using the scaled topographic data. The generated image corresponds to a representation of the bullet, in which the microscopic features are enhanced while the form remains unchanged. The generated image may be stored in a memory or displayed on a display unit.

While the present description refers to the scaling of the microscopic data, it should be understood that the macroscopic data may be scaled in order to enhance the microscopic features while the microscopic data remains unchanged. In this case, a scaling factor having a value between zero and one is applied to the macroscopic data in order to enhance the microscopic features with respect to the macroscopic form. In this case, the size of the microscopic features remains unchanged while the dimensions of the macroscopic form are reduced.

While the present method is directed to the generation of a modified image of the topography of a bullet, it should be understood that the method may be used to generate a modified 3D image of any other objects having a macroscopic form and microscopic features. For example, the method may be used for generating a modified image of the topography of the internal surface of a gun barrel.

While the present description refers to the application of a positive scaling factor to the microscopic data, it should be understood that a negative scaling factor at least inferior to minus one may be applied to the microscopic data. Such a negative scaling factor may be used when a bullet is to be compared to the barrel of a firearm in order to determine whether the bullet was fired from the firearm. When a bullet is fired from a firearm, at least some microscopic features of the internal surface topography of the firearm barrel are transferred to the bullet so that peaks of the barrel topography become valleys in the bullet topography, and vice versa. As a result, most of the topography of the bullet is a negative image of that of the barrel. In order to compare the bullet topography to that of the barrel, the method illustrated in FIG. 5 may be applied to both the bullet and the barrel with the use of a positive scaling factor for the bullet and a negative scaling factor for the barrel in order to reverse the topography of the barrel. For example, a first scaling factor equal to +2 may be applied to the microscopic data of the bullet and a second scaling factor equal to −2 may be applied to the microscopic data of the barrel. As a result, enhanced peaks and valleys of the bullet topography may be compared with enhanced peaks and valleys of the barrel topography, respectively. The negative scaling factor may be applied to the bullet microscopic data and the positive scaling factor may be applied to the barrel microscopic data.

In another example, it may be easier for a user to compare peaks of different bullet topographies rather than valleys. If bullets to be compared each have a topography comprising better defined valleys than peaks, the user may apply a negative scaling factor to the two bullets in order to compare the negative or reverse topographies of the two bullets.

In one embodiment, the method 100 further comprises modifying the macroscopic data independently from the microscopic data in order to modify the macroscopic form for the representation of the bullet. For example, if the acquired bullet is deformed, the original macroscopic data may be modified to modify the form of the deformed bullet. The new form of the deformed bullet may correspond to the form of a pristine bullet or that of a comparison bullet. In this case, the modified 3D image of the bullet is obtained by combining the modified microscopic data and the modified macroscopic data. The resulting image is a representation of the bullet with a modified form and enhanced microscopic features.

Figure 7A:
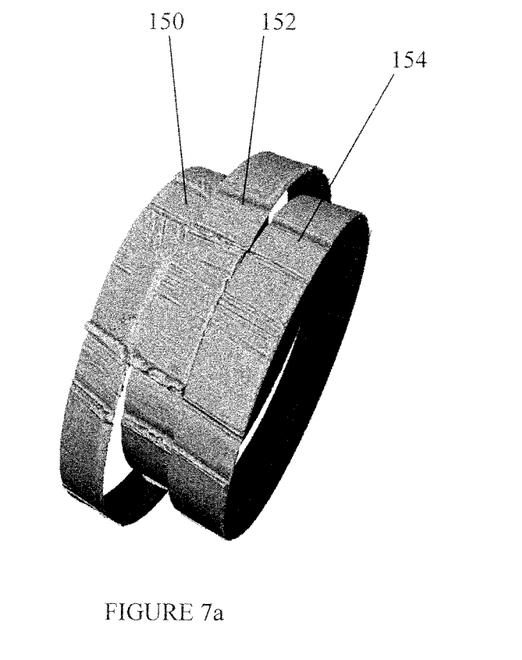
FIG. 7*a* illustrates two deformed bullets and a pristine bullet, each having enhanced microscopic features, in accordance with an embodiment.
Figure 7B:
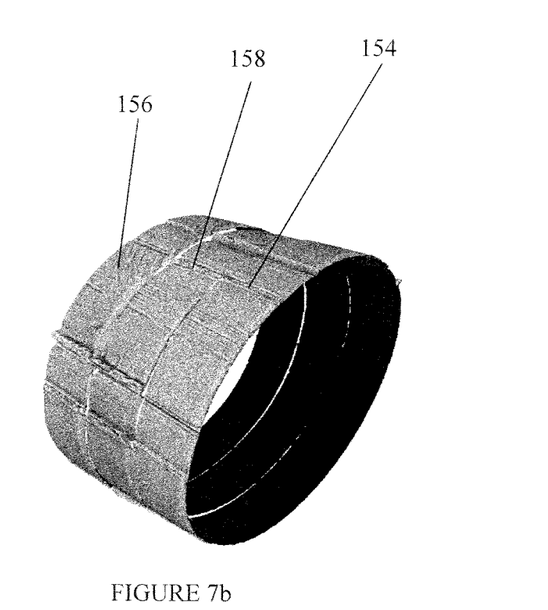
FIG. 7*b* illustrates the two deformed bullets of FIG. 7*a* of which the form has been modified to correspond to that of the pristine bullet of FIG. 7*a*, in accordance with an embodiment.

FIG. 7a illustrates two deformed bullets 150 and 152 and a pristine bullet 154, of which the microscopic features have been enhanced using the method described above. The form of the bullets 150 and 152 is then modified to correspond to the form of the pristine bullet 154. FIG. 7b illustrates bullets 156 and 158 which have the pristine form of the bullet 154 and respectively correspond to the bullets 150 and 152. Since the three bullets 154, 156, 158 have the same pristine form, the comparison of the three bullets is facilitated.

In one embodiment, the topographic data acquired at step 102 of the method 100 is represented by a square or rectangular matrix [i, j] forming a grid of points of which each point is associated with a set of spatial coordinates X, Y, and Z, where the i index varies between Q and (Ni−1) inclusively, and the j index varies between Q and (Nj−1) inclusively. Three spatial coordinate matrices or grids are obtained: X[i,j], Y[i,j], and Z[i,j].

In one embodiment, the scale is the same along the three different X-Y-Z axes. The X and Y values are such that a distance between neighbouring points of the grid along the vertical or horizontal direction is a constant Q, or follows a statistical distribution centered on Q with standard deviation much smaller than Q, as expressed in the following equation:

$$|X[i+1]-X[i]| \cong Q$$

$$|Y[i+1]-Y[i]| \cong Q$$

In one embodiment, Q is the pixel size of the sensor. Alternatively, Q may have a dimension different from the pixel size.

At step 104 of the method 100, the topographic data stored in the three-grid format is split into microscopic data and macroscopic data. Each one of the three grids X[i,j], Y[i,j], and Z[i,j] is convolved with a same low pass filter. The output of the filter is a new set of grids (XMacro[i,j], YMacro[i,j], ZMacro[i,j]) which only comprises macroscopic information about the macroscopic form.

Any adequate low pass filter may be used. The low pass filter may be a square uniform matrix, a bi-dimensional Gaussian filter, or the like. In one embodiment, the filter takes into account the wraparound situation if the object has a closed form such as a ring or a cylinder, for example.

The microscopic data is then obtained from the difference between the original topographic data and the obtained macroscopic data, as expressed in the following equations:

$$X\text{micro}[i,j]=X[i,j]-X\text{Macro}[i,j]$$

$$Y\text{micro}[i,j]=Y[i,j]-Y\text{Macro}[i,j]$$

$$Z\text{micro}[i,j]=Z[i,j]-Z\text{Macro}[i,j]$$

A high pass filter may be applied to the three grids X[i,j], Y[i,j], and Z[i,j] in order to obtain the microscopic data (Xmicro[i,j], Ymicro[i,j], Zmicro[i,j]). The macroscopic data (XMacro[i,j], YMacro[i,j], ZMacro[i,j]) is then obtained by subtracting the microscopic data (Xmicro[i,j], Ymicro[i,j], Zmicro[i,j]) from the original topographic data (X[i,j], Y[i,j], Z[i,j]).

At step 106, the microscopic features are enhanced by multiplying the microscopic data (Xmicro[i,j], Ymicro[i,j], Zmicro[i,j]) by a same scaling factor k to obtained enhanced microscopic data (kXmicro[i,j], kYmicro[i,j], kZmicro[i,j]). The scaling factor k may be greater than 1 or less than −1.

The enhanced microscopic data are then added to the unchanged macroscopic data as expressed in the following equations:

$$X\text{New}[i,j]=X\text{Macro}[i,j]+kX\text{micro}[i,j]$$

$$Y\text{New}[i,j]=Y\text{Macro}[i,j]+kY\text{micro}[i,j]$$

$$Z\text{New}[i,j]=Z\text{Macro}[i,j]+kZ\text{micro}[i,j]$$

In another embodiment, the 3D topographic data may be represented in an image format. The 3D topographic data is a square or rectangular matrix or grid of points of which each point is associated with a height or depth value Z. Any point (i, j) of the topography is described by the set of three values (iQ, jQ, Z[i,j]), where Q is the size of the image pixel. The i index varies between 0 and Ni−1 inclusively, and the j index varies between 0 and Nj−1. For illustrative purposes, it is assumed that the scale is the same along the i and j axes, but the method may be generalized if it is not the case.

The macroscopic data Zmacro[i,j] is obtained by convolving the topographic data Z[i,j] with an adequate low pass filter, and the microscopic information is obtained by subtracting the macroscopic data from the topographic data Z[i, j] as expressed in the following equation:

$$Z\text{micro}[i,j]=Z[i,j]-Z\text{Macro}[i,j]$$

The step of enhancing the microscopic data is performed by multiplying Zmicro[i,j] by a scaling factor k. The scaling factor may be greater than 1 or less than −1

$$Z\text{New}[i,j]=Z\text{Macro}[i,j]+kZ\text{micro}[i,j]$$

Alternatively, the step of enhancing the microscopic features may comprise multiplying the macroscopic data Zmacro[i,j] by a scaling factor k', as expressed by the following equation:

$$Z\text{New}[i,j]=k'Z\text{macro}[i,j]+Z\text{micro}[i,j]$$

In this case, the scaling factor k' is between 0 and 1. Alternatively, if a reverse topography is desired, the factor k' may be comprised between −1 and 0.

In one embodiment, the method 100 is used to compare a pair of bullets having different forms and the form of one bullet is modified to correspond to that of the other bullet.

The input data is two square or rectangular matrices of X, Y and Z values, i.e. a first set (X1[(i,j], Y1[i,j], Z1[i,j]) representing the topographic data of the first bullet where the i index varies between 0 and (N1i−1) and the j index varies between 0 and (N1j−1), and a second set (X2[i,j], Y2[i,j], Z2[i,j]) representing the topographic data of the second bullet, where the i index varies between 0 and (N2i−1) and the j index varies between 0 and (N2j−1).

For simplification purposes, it is assumed that the scale is the same along the three different X-Y-Z axes, for both topographies. The X and Y values are such that the distance between neighbouring points of the grid along the vertical or horizontal direction is a constant Q, or follows a statistical distribution centered on Q with standard deviation much smaller than Q, as expressed in the following equations:

$$|X1[i+1]-X1[i]| \cong Q$$

$$|Y1[i+1]-Y1[i]| \cong Q$$

$$|X2[i+1]-X2[i]| \cong Q$$

$$|Y2[i+1]-Y2[i]| \cong Q$$

The topographic data for each bullet is split into microscopic data and macroscopic data. The macroscopic data is obtained by applying a low pass filter to the topographic data and the microscopic data is obtained by subtracting the obtained macroscopic data from the topographic data as expressed in the following equations:

$$X1\text{micro}[i,j]=X1[i,j]-X1\text{Macro}[i,j]$$

$$Y1\text{micro}[i,j]=Y1[i,j]-Y1\text{Macro}[i,j]$$

$$Z1\text{micro}[i,j]=Z1[i,j]-Z1\text{Macro}[i,j]$$

$$X2\text{micro}[i,j]=X2[i,j]-X2\text{Macro}[i,j]$$

$$Y2\text{micro}[i,j]=Y2[i,j]-Y2\text{Macro}[i,j]$$

$$Z2\text{micro}[i,j]=Z2[i,j]-Z2\text{Macro}[i,j]$$

In one embodiment, roughness images, such as the roughness image 70 illustrated in FIG. 3, are used in addition to 3D images to compare a pair of bullets. Roughness images for the two bullets to be compared are generated and a user selects one of the two bullets as being a reference bullet. For example, the first bullet is chosen as the reference bullet. The user then translates the roughness image of the first bullet with respect to the roughness image of the second bullet to find matching lines. At some translation T, the user finds matching lines on both bullets. 3D images of the bullets are then generated and the user modifies the 3D image of one bullet so that the form of the bullet matches the form of the other bullet in addition to enhancing the microscopic features for the two bullets, as described above.

In the following, four scenarios for modifying the form of one bullet to match the form of the other bullet are presented. For simplification purposes, a translation T is applied on the first bullet. The scenarios may be generalized for a translation T1 and T2 applied on each bullet, respectively. Furthermore, a scaling factor k is applied on both bullets. The scenarios may be generalized for a scaling factor k1 and k2 applied on each bullet, respectively.

In one embodiment, a stretching factor may be applied on both bullets since the two compared bullets may have suffered from a different expansion factor during firing. For simplification purposes, a stretching factor S is applied on the first bullet. The scenarios may be generalized for a stretching factor S1 and S2 applied on each bullet, respectively.

In one embodiment, the bullets may have a wraparound form. Alternatively, at least one of the two bullets may not have a wraparound form when the bullet is a fragment or only a portion of the actual circumference has been acquired by the 3D sensor, for example.

In one embodiment, N1i is equal to N2i, no stretching S is required, and at least the first bullet has a wraparound form. In this case, the form of the first bullet is applied to the second bullet by replacing the set of macroscopic data of the second bullet, i.e. (X2Macro[i, j], Y2Macro[i, j], Z2Macro[i, j]) by that of the first bullet, i.e. (X1Macro[i', j], Y1Macro[i', j], Z1Macro[i', j])

where i'=(i−T) Mod Ni.

The image for the second bullet is generated using the following modified topographic data:

$$X2\text{New}[i,j]=X1\text{Macro}[i',j]+kX2\text{micro}[i,j]$$

$$Y2\text{New}[i,j]=Y1\text{Macro}[i',j]+kY2\text{micro}[i,j]$$

$$Z2\text{New}[i,j]=Z1\text{Macro}[i',j]+kZ2\text{micro}[i,j]$$

where k is the scaling factor for the microscopic data.
The image for the first bullet is generated using the following modified topographic data:

$$X1\text{New}[i,j]=X1\text{Macro}[i,j]+kX1\text{micro}[i,j]$$

$$Y1\text{New}[i,j]=Y1\text{Macro}[i,j]+kY1\text{micro}[i,j]$$

$$Z1\text{New}[i,j]=Z1\text{Macro}[i,j]+kZ1\text{micro}[i,j]$$

In another embodiment, N1i is different from N2i, at least the first bullet has a wraparound form, and a stretching S is required. In this case, the form of the first bullet is applied to the second bullet by replacing the set of macroscopic data of the second bullet, i.e. (X2Macro[i, j], Y2Macro[i, j], Z2Macro [i, j]) by that of the first bullet, i.e. (X1Macro[i', j], Y1Macro [i', j], Z1Macro[i', j])

where i' is a combination of modulation and rescaling operations and expressed as:

$$i'=[(i-T)*S \text{ Mod } N1i]$$

It should be understood that interpolation may be required if S is not an integer.

The image for the second bullet is generated using the following modified topographic data:

$$X2\text{New}[i,j]=X1\text{Macro}[i',j]+kX2\text{micro}[i,j]$$

$$Y2\text{New}[i,j]=Y1\text{Macro}[i',j]+kY2\text{micro}[i,j]$$

$$Z2\text{New}[i,j]=Z1\text{Macro}[i',j]+kZ2\text{micro}[i,j]$$

where k is the scaling factor for the microscopic data.
The image for the first bullet is generated using the following modified topographic data:

$$X1\text{New}[i,j]=X1\text{Macro}[i,j]+kX1\text{micro}[i,j]$$

$$Y1\text{New}[i,j]=Y1\text{Macro}[i,j]+kY1\text{micro}[i,j]$$

$$Z1\text{New}[i,j]=Z1\text{Macro}[i,j]+kZ1\text{micro}[i,j]$$

In another embodiment, the first bullet does not have a wraparound form and no stretching is required. In this case, the form of the first bullet is applied to the second bullet by replacing the set of macroscopic data of the second bullet, i.e. (X2Macro[i, j], Y2Macro[i, j], Z2Macro[i, j]) by that of the first bullet, i.e. (X1Macro[i', j], Y1Macro[i', j], Z1Macro[i', j]) where i'=(i−T) and T corresponds to the translation applied to the roughness image of the first bullet for matching tool marks between the two bullets.

A common area between the two bullets is defined by the set of i indices which satisfy the following equations:

$$0 \leq i < N2i; \text{ and}$$

$$0 \leq i-T < N1i$$

The image for the second bullet is generated using the following modified topographic data:

$$X2\text{New}[i,j]=X1\text{Macro}[i',j]+kX2\text{micro}[i,j]$$

$$Y2\text{New}[i,j]=Y1\text{Macro}[i',j]+kY2\text{micro}[i,j]$$

$$Z2\text{New}[i,j]=Z1\text{Macro}[i',j]+kZ2\text{micro}[i,j]$$

where k is the scaling factor applied to the microscopic data in order to enhance the microscopic features.
The image for the first bullet is generated using the following modified topographic data:

$$X1\text{New}[i,j]=X1\text{Macro}[i,j]+kX1\text{micro}[i,j]$$

$$Y1\text{New}[i,j]=Y1\text{Macro}[i,j]+kY1\text{micro}[i,j]$$

$$Z1\text{New}[i,j]=Z1\text{Macro}[i,j]+kZ1\text{micro}[i,j]$$

In a further embodiment, N1i and N2i are different, a stretching S is required, and the first bullet is not wraparound. In this case, the form of the first bullet is applied to the second bullet by replacing the set of macroscopic data of the second bullet, i.e. (X2Macro[i, j], Y2Macro[i, j], Z2Macro[i, j]) by that of the first bullet, i.e. (X1Macro[i'', j], Y1Macro[i'', j], Z1Macro[i'', j]), where i'=[(i−T)*S].

It should be understood that interpolation may be required if S is not an integer.

A common area between the two bullets is defined by the set of i indices which satisfy the following equations:

$$0 \leq i < N2i; \text{ and}$$

$$0 \leq (i-T)*S < N1i.$$

The image for the second bullet is generated using the following modified topographic data:

$$X2\text{New}[i,j] = X1\text{Macro}[i',j] + kX2\text{micro}[i,j]$$

$$Y2\text{New}[i,j] = Y1\text{Macro}[i',j] + kY2\text{micro}[i,j]$$

$$Z2\text{New}[i,j] = Z1\text{Macro}[i',j] + kZ2\text{micro}[i,j]$$

where k is the scaling factor applied to the microscopic data in order to enhance the microscopic features.

The image for the first bullet is generated using the following modified topographic data:

$$X1\text{New}[i,j] = X1\text{Macro}[i,j] + kX1\text{micro}[i,j]$$

$$Y1\text{New}[i,j] = Y1\text{Macro}[i,j] + kY1\text{micro}[i,j]$$

$$Z1\text{New}[i,j] = Z1\text{Macro}[i,j] + kZ1\text{micro}[i,j]$$

The form of bullet may be replaced by any adequate form or shape. For example, the form of a bullet may be replaced by the shape of the bullet to which it is compared or the shape of a barrel to which it is compared.

Alternatively, the form of the bullet may be replaced by a reference form such as an analytical form, for example.

In one embodiment, the form of a bullet is replaced by an analytical cylindrical form which corresponds to the form of a pristine bullet. If the X axis is assumed to be the symmetry axis, then macroscopic data of the bullet, i.e. X1Macro[i. j], Y1Macro[i. j], Z1Macro[i. j] is replaced by:

$$X1\text{Macro}[i,j], R \cos \theta[i], R \sin \theta[i]$$

where R is the radius of the cylinder and θ[i] is computed as follows:

$$\theta[i] = N1i \cdot (i-1)/(2\pi)$$

Figure 8A:
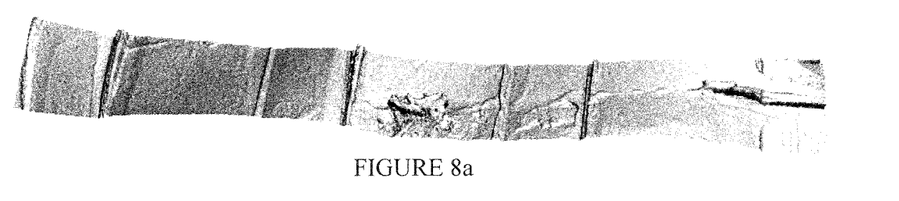
FIGS. 8*a*, 8*b*, and 8*c* illustrate different types of viewing techniques: rendering on raw 3D data (8*a*), applied texture with a 2D image (8*b*) and applied texture with a roughness image (8*c*), in accordance with an embodiment.
Figure 8B:
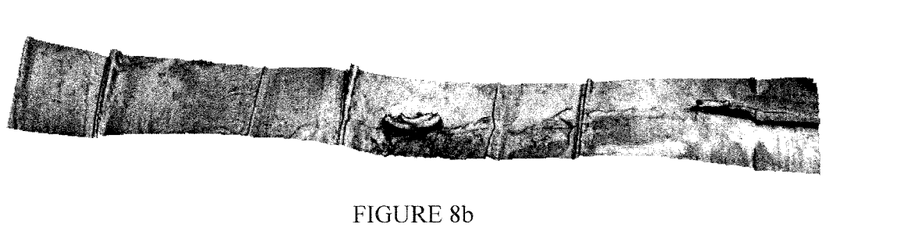
Figure 8C:
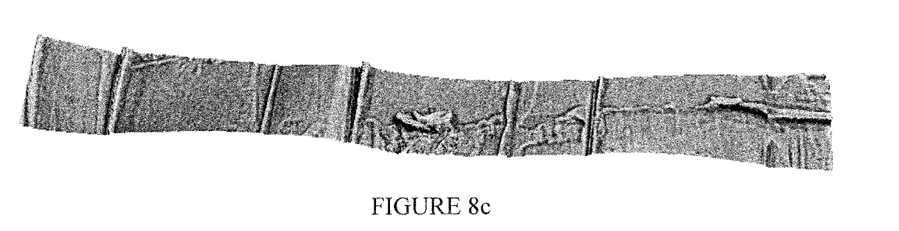

Standard techniques can be used to display the topography generated by the present methods and to combine it with other relevant data available. Some of these techniques are illustrated in FIGS. 8a, 8b, and 8c.

Rendering can be applied on the topography, which may be either the raw acquired data or the digital data which results from the transformations applied to the raw data (i.e., enhancement of microscopic information or modifications of the macroscopic information, or both). An example is shown in FIG. 8a.

Texture may also be applied to the displayed topography. Available texture images may be the 2D mosaic and the roughness mosaic (the latter already shown in FIG. 3). Examples of both applied textures are shown in FIGS. 8b and 8c, respectively.

Rendering is based on models of reflection, scattering, and shading which are well known to a person skilled in the art. Such models can simulate the relationship between the incoming light from virtual light sources at known locations in space and the outgoing light from the illuminated objects. The parameters of these models can be dynamically adjusted in order to bring a realistic aspect to the reflecting objects. Different types of surfaces can be simulated, such as a metallic (i.e., highly specular) or a more diffuse surface. Multiple reflections and light trapping can also be simulated with high performance hardware.

Applied rendering on each pixel is a function of the local normal, relative position of the virtual light source with respect to the pixel and relative position of the observer with respect to the pixel. The outcome of the rendering operation can be modified by enhancing the projection of the local normal n along a predetermined direction v. Normal n may be replaced by the following normal n':

$$n' = \frac{n + k(n \cdot v)}{|n + k(n \cdot v)|}$$

where k is a selectable real number and v is the predetermined direction. This global normal transformation, known as slope exaggeration, is especially appropriate when the 3D topography is described in image format (iQ, jQ, Z[i,j]), as described above, and when the normalized direction v is along the Z axis.

Another method, which is non-global, may also be used. In this case, the normal is replaced by enhancing its component difference with respect to the mean normal computed from the neighborhood around the pixel:

$$n' = \frac{n + k(n - \text{Mean\_n})}{|n + k(n - \text{Mean\_n})|}$$

Other normal transformations (global or non-global) could be used as well.

Figure 9:
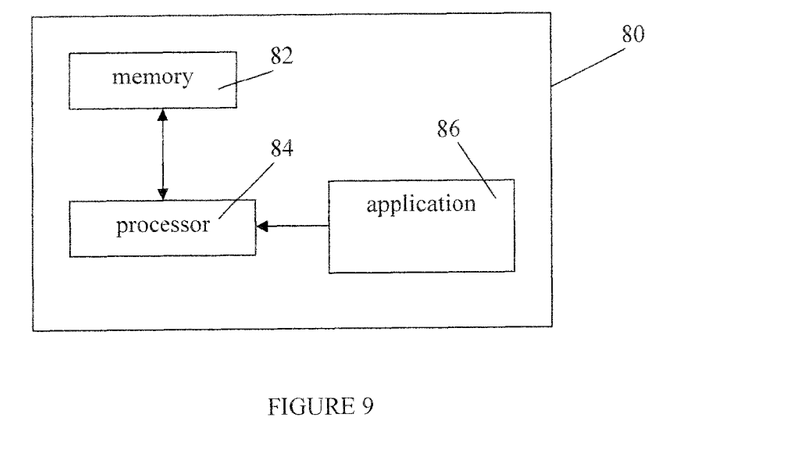
FIG. 9 illustrates a computer device comprising an application coupled to a memory and a processor, for generating a modified representation of an object, in accordance with an embodiment.

FIG. 9 illustrates a system for generating a modified representation of an object having a macroscopic form and microscopic features, embodied on a computer device as an application 86 running on a processor 84, the processor being coupled to a memory 82.

The memory 82 accessible by the processor 84 receives and stores data, such as acquired 3D topographies, and any other information used by the system. The memory 82 may be a main memory, such as a high speed Random Access Memory (RAM), or an auxiliary storage unit, such as a hard disk, a floppy disk, or a magnetic tape drive. The memory may be any other type of memory, such as a Read-Only Memory (ROM), or optical storage media such as a videodisc and a compact disc.

The processor 84 may access the memory 82 to retrieve data. The processor 84 may be any device that can perform operations on data. Examples are a central processing unit (CPU), a front-end processor, a microprocessor, a graphics processing unit (GPU/VPU), a physics processing unit (PPU), a digital signal processor, and a network processor. The application 86 is coupled to the processor 84 and is configured to perform various tasks as explained above. An output may be transmitted to a user via a display.

Figure 10:
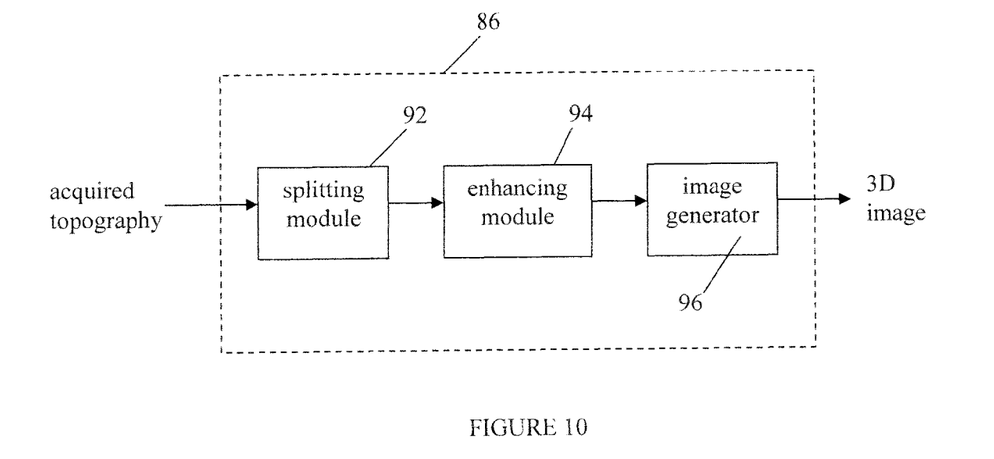
FIG. 10 illustrates an exemplary embodiment of the application of FIG. 9.

FIG. 10 illustrates a more detailed example of the application 86 of FIG. 9. In this example, the application comprises a splitting module 92 adapted to split 3D topographic data representative of at least one portion of the object having a macroscopic form and microscopic features into microscopic data representative of the microscopic features and macroscopic data representative of the macroscopic form; an enhancing module 94 adapted to independently scale one of the microscopic data and the macroscopic data in order to enhance the microscopic features with respect to the macroscopic form and obtain scaled topographic data; and an image generator 96 adapted to generate a 3D image using the scaled topographic data.

In one embodiment, the system may also comprise a scanning device adapted to acquire the 3D topography of the object and adapted to transmit the acquired 3D topography data to the system, and/or a display unit adapted to display.

While illustrated in the block diagrams as groups of discrete components communicating with each other via distinct data signal connections, it will be understood by those skilled in the art that the embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

The embodiments of the invention described above are intended to be exemplary only. The scope of the invention is therefore intended to be limited solely by the scope of the appended claims.

The invention claimed is:

1. A method for generating a 3D representation of an object, comprising:
    acquiring at a scanning device 3D topographic data representative of at least one portion of the object having a macroscopic form and microscopic features; and
    executing on a processor program code for:
    separating the 3D topographic data into microscopic data representative of the microscopic features and macroscopic data representative of the macroscopic form;
    independently scaling one of the microscopic data and the macroscopic data in order to enhance the microscopic features with respect to the macroscopic form, thereby obtaining scaled topographic data;
    combining the macroscopic data of the object with microscopic data of another object, thereby obtaining modified topographic data representative of a modified object, for use in comparing the microscopic features of the object to microscopic features of the modified object in a tool mark analysis; and
    generating a 3D image using the scaled topographic data, thereby obtaining a modified representation having enhanced microscopic features for the at least one portion of the object.

2. The method of claim 1, wherein separating the 3D topographic data comprises applying a low-pass filter to the topographic data in order to obtain the macroscopic data and subtracting the macroscopic data from the topographic data to obtain the microscopic data.

3. The method of claim 1, wherein separating the 3D topographic data comprises applying a high pass filter to the topographic data to obtain the microscopic data and subtracting the microscopic data from the topographic data to obtain the macroscopic data.

4. The method of claim 1, wherein independently scaling one of the microscopic data and the macroscopic data comprises at least one of applying a scaling factor having an absolute value greater than one to the microscopic data and applying a scaling factor having an absolute value between zero and one to the macroscopic data.

5. The method of claim 1, wherein generating a 3D image using the scaled topographic data comprises one of combining scaled microscopic data and unscaled macroscopic data and unscaled microscopic data and scaled macroscopic data.

6. The method of claim 1, wherein independently scaling one of the microscopic data and the macroscopic data comprises at least one of applying a scaling factor having a value less than negative one to the microscopic data and applying a scaling factor having a value between zero and negative one to the macroscopic data.

7. The method of claim 1, further comprising executing on the processor program code for modifying the macroscopic data independently from the microscopic data to modify the macroscopic form, thereby obtaining scaled and form-modified topographic data, and wherein generating a 3D image comprises generating the 3D image using the scaled and form-modified topographic data.

8. The method of claim 1, wherein combining the macroscopic data of the object with microscopic data of another object comprises replacing the macroscopic data of the object with one of a set of macroscopic data of a reference object and a set of macroscopic data of a comparison object.

9. The method of claim 7, wherein modifying the macroscopic data comprises applying a stretching factor thereto.

10. A system for generating a 3D representation of an object, comprising:
    a processing unit;
    a memory for storing original 3D topographic data representative of at least one portion of the object having a macroscopic form and microscopic features; and
    an application coupled to the processing unit and the memory, wherein the application, when executed on the processing unit, performs steps of:
    separating the 3D topographic data into microscopic data representative of the microscopic features and macroscopic data representative of the macroscopic form;
    independently scaling one of the microscopic data and the macroscopic data in order to enhance the microscopic features with respect to the macroscopic form, thereby obtaining scaled topographic data;
    combining the macroscopic data of the object with microscopic data of another object, thereby obtaining modified topographic data representative of a modified object, for use in comparing the microscopic features of the object to microscopic features of the modified object in a tool mark analysis; and
    generating a 3D image using the scaled topographic data, thereby obtaining a modified representation having enhanced microscopic features for the at least one portion of the object.

11. The system of claim 10, wherein the application is configured for applying a low-pass filter to the topographic data in order to obtain the macroscopic data and subtracting the macroscopic data from the topographic data to obtain the microscopic data.

12. The system of claim 10, wherein the application is configured for applying a high pass filter to the topographic data to obtain the microscopic data and subtracting the microscopic data from the topographic data to obtain the macroscopic data.

13. The system of claim 10, wherein the application is configured for at least one of applying a scaling factor having an absolute value greater than one to the microscopic data and applying a scaling factor having an absolute value between zero and one to the macroscopic data in order to independently scale one of the microscopic data and the macroscopic data.

14. The system of claim 10, wherein the application is configured for one of combining scaled microscopic data and unscaled macroscopic data and unscaled microscopic data and scaled macroscopic data, for generating the 3D image.

15. The system of claim 10, wherein the application is configured for at least one of applying a scaling factor having a value less than negative one to the microscopic data and applying a scaling factor having a value between zero and negative one to the macroscopic data, when independently scaling one of the microscopic data and the macroscopic data.

16. The system of claim 10, wherein the application further performs a step of modifying the macroscopic data independently from the microscopic data to modify the macroscopic form, thereby obtaining scaled and form-modified topographic data, and wherein the 3D image is generated using the scaled and form-modified topographic data.

17. The system of claim 10, wherein combining the macroscopic data of the object with microscopic data of another object comprises replacing the macroscopic data of the object with one of a set of macroscopic data of a reference object and a set of macroscopic data of a comparison object.

18. The system of claim 16, wherein modifying the macroscopic data comprises applying a stretching factor thereto.

19. A software product embodied on a non-transitory computer readable medium and comprising instructions for generating a 3D representation of an object, comprising:
- a splitting module adapted to separate 3D topographic data representative of at least one portion of the object having a macroscopic form and microscopic features into microscopic data representative of the microscopic features and macroscopic data representative of the macroscopic form;
- an enhancing module adapted to
  - independently scale one of the microscopic data and the macroscopic data in order to enhance the microscopic features with respect to the macroscopic form, thereby obtaining scaled topographic data, and
  - combine the macroscopic data of the object with microscopic data of another object, thereby obtaining modified topographic data representative of a modified object, for use in comparing the microscopic features of the object to microscopic features of the modified object in a tool mark analysis; and
- an image generator adapted to generate a 3D image using the scaled topographic data, thereby obtaining a modified representation having enhanced microscopic features for the at least one portion of the object.

* * * * *